United States Patent
Soofi et al.

(10) Patent No.: US 10,613,214 B2
(45) Date of Patent: Apr. 7, 2020

(54) TERRESTRIAL IMAGING USING MULTI-POLARIZATION SYNTHETIC APERTURE RADAR

(71) Applicant: CONOCOPHILLIPS COMPANY, Houston, TX (US)

(72) Inventors: Khalid A. Soofi, Houston, TX (US); Sarah E. Terry, Houston, TX (US); Manuel A. Prado, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 803 days.

(21) Appl. No.: 15/203,327

(22) Filed: Jul. 6, 2016

(65) Prior Publication Data

US 2017/0010353 A1    Jan. 12, 2017

Related U.S. Application Data

(60) Provisional application No. 62/190,103, filed on Jul. 8, 2015.

(51) Int. Cl.
    *G01S 13/90*    (2006.01)
    *G01S 7/02*    (2006.01)
    *G01S 7/41*    (2006.01)

(52) U.S. Cl.
    CPC ........... *G01S 13/90* (2013.01); *G01S 7/024* (2013.01); *G01S 7/412* (2013.01); *G01S 13/9076* (2019.05)

(58) Field of Classification Search
    CPC ......... G01S 13/90; G01S 7/024; G01S 7/412; G01S 13/9076; G01S 2013/9076

(Continued)

(56) References Cited

U.S. PATENT DOCUMENTS 5,313,210 A * 5/1994 Gail ................. G01S 7/025
    342/25
5,886,662 A    3/1999 Johnson
(Continued)

FOREIGN PATENT DOCUMENTS

EP    1187034 A2 *  3/2002 .............. G06F 17/18

OTHER PUBLICATIONS

International Search Report for PCT/US2016/041154 dated Mar. 17, 2017; 2 pgs.

(Continued)

*Primary Examiner* — Timothy X Pham
(74) *Attorney, Agent, or Firm* — Polsinelli PC

(57) ABSTRACT

An embodiment of a method for processing synthetic aperture radar (SAR) image data includes acquiring a multi-polarization SAR image of a terrestrial region, pre-processing the SAR image to remove or reduce radiometric and geometric errors, and separating the SAR image into a plurality of channels, each channel representing an image associated with a different polarization mode. The method also includes calculating a characteristic of the region for each polarization channel, acquiring ground data and estimating the characteristic of the region based on the ground data, estimating a correlation of the calculated characteristic for each polarization channel with the estimated characteristic based on the ground data, selecting one or more polarization channels having a correlation exceeding a selected value, and generating a SAR image including only the selected polarization channels based on the comparison.

20 Claims, 11 Drawing Sheets

(58) Field of Classification Search
USPC .......................................................... 342/25
See application file for complete search history.

(56) References Cited

U.S. PATENT DOCUMENTS

| | | | |
|---|---|---|---|
| 8,422,738 B1 | 4/2013 | Stastny et al. | |
| 2004/0032361 A1* | 2/2004 | Kirscht | G01S 13/9029 342/25 R |
| 2010/0225531 A1 | 9/2010 | Johnson | |
| 2011/0043402 A1* | 2/2011 | Sasakawa | G01C 11/02 342/25 A |
| 2011/0169686 A1* | 7/2011 | Eusebi Borzelli | G01S 7/414 342/25 A |
| 2013/0004017 A1* | 1/2013 | Medasani | G01S 7/412 382/103 |
| 2013/0082856 A1* | 4/2013 | Paglieroni | G01S 13/90 342/22 |
| 2013/0216089 A1* | 8/2013 | Chen | G06T 7/0002 382/100 |
| 2014/0062764 A1* | 3/2014 | Reis | G01S 13/9023 342/25 C |
| 2018/0003815 A1* | 1/2018 | Ranney | G01S 13/887 |
| 2018/0335518 A1* | 11/2018 | Fox | G01S 7/025 |

OTHER PUBLICATIONS

Sugardiman, Ruandha Agung—"Spaceborne Radar Monitoring of Forest Fires and Forest Cover Change: a case study in Kalimantan", 2007, Wageningen University, Wageningen, Netherlands, ISBN 90-8504-604-1; 202 pgs.

Tanase, Mihai A., et al—"Estimation of Forest Biomass from L-Band Polarimetric Decomposition Components", 2013, IEEE International Geosciene and Remote Sensing Symposium, 1 pg., abstract only.

Dhar, Tishampati, et al—"Estimation of Pasture Biomass and Soil-moisture Using Dual-polarimetric X and L Band SAR-Accuracy Assessment with Field Data", 2010, IEEE International, IEEE Piscataway, NJ, XP031812208; 1 pg, abstract only.

Pottier Eric, et al—"Advanced Concepts", 2011, Lecture Notes Advanced Concepts, XP055148465; 65 pgs.

Sarker, Latifur Rahman, et al—"Forest Biomass Estimation Using Texture Measurements of High-Resolution Dual-Polarization C-Band SAR Data", 2013, IEEE Transactions on Geoscience and Remote Sensing, vol. 51, Issue No. 6, 87 pgs.

Alberga, V., et al—"Comparison of Polarimetric SAR Observables in Terms of Classification Performance", 2008, International Journal of Remote Sensing, vol. 29, Issue No. 20, pp. 4129-4150; 23 pgs.

* cited by examiner

TERRESTRIAL IMAGING USING MULTI-POLARIZATION SYNTHETIC APERTURE RADAR

PRIOR RELATED APPLICATIONS

This application is a non-provisional application which claims benefit under 35 USC § 119(e) to U.S. Provisional Application Ser. No. 62/190,103 filed Jul. 8, 2015, entitled "TERRESTRIAL IMAGING USING MULTI-POLARIZATION SYNTHETIC APERTURE RADAR," which is incorporated herein in its entirety.

BACKGROUND

Synthetic Aperture Radar (SAR) systems employ a type of radar used to create two and/or three-dimensional images of terrestrial regions. SAR uses the motion of an antenna, which is incorporated in a moving platform such as an aircraft or spacecraft, over a target region to provide finer spatial resolution than is possible with conventional beam-scanning radars. The distance the SAR device travels over a target creates a large "synthetic" antenna aperture, which allows for the creation of relatively high resolution images with relatively small physical antennas.

SAR systems have been used for various imaging operations, such as land use monitoring and forest mapping, especially in areas such as rain forests having perpetual cloud cover or otherwise affected by cloud cover and other atmospheric conditions. SAR is able to penetrate cloud cover and thus can be a reliable source of data for creating forest and land maps. This information is useful for, e.g., monitoring deforestation and guiding decisions on locating hydrocarbon exploration and production facilities in forest settings and other sensitive environments.

BRIEF SUMMARY OF THE DISCLOSURE

An embodiment of a method for processing synthetic aperture radar (SAR) image data includes acquiring a multi-polarization SAR image of a terrestrial region, pre-processing the SAR image to remove or reduce radiometric and geometric errors, and separating the SAR image into a plurality of channels, each channel representing an image associated with a different polarization mode. The method also includes calculating a characteristic of the region for each polarization channel, acquiring ground data and estimating the characteristic of the region based on the ground data, estimating a correlation of the calculated characteristic for each polarization channel with the estimated characteristic based on the ground data, selecting one or more polarization channels having a correlation exceeding a selected value, and generating a SAR image including only the selected polarization channels based on the comparison.

An embodiment of a system for processing synthetic aperture radar (SAR) image data includes a processing device configured to execute instructions stored on a machine-readable medium. The processing device includes a data collection module configured to acquire a multi-polarization SAR image of a terrestrial region, and a pre-processing module. The pre-processing module is configured to perform pre-processing the SAR image to remove or reduce radiometric and geometric errors, separating the SAR image into a plurality of channels, each representing an image associated with a different polarization mode, and calculating a characteristic of the region for each polarization channel. The pre-processing module is also configured to perform acquiring ground data and estimating the characteristic of the region based on the ground data, estimating a correlation of the calculated characteristic for each polarization channel with the estimated characteristic based on the ground data, selecting one or more polarization channels having a correlation exceeding a selected value, and generating a SAR image including only the selected polarization channels.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION

Embodiments of systems, apparatuses and methods are described herein for synthetic aperture radar (SAR) imaging and processing. An embodiment of a processing system employs algorithms and methods for acquiring and processing multi-polarization SAR image data. The system is configured to perform pre-processing methods including radiometric calibration, geometric calibration, noise removal, shadow removal and/or geocoding. In one embodiment, pre-processing components are employed (such as shadow removal and slope correction) in conjunction with independently derived or acquired topographic and/or topological maps for a more accurate correction. In one embodiment, processing includes analyzing constituent polarizations of multi-polarization SAR data to determine the most effective polarization mode combination based on comparison of individual polarization modes with other ground information. For example, biomass calculations are performed using different polarization modes, and compared to ground-based biomass estimations to determine the best combination of polarizations for a particular land area and/or for identification or highlighting of selected types of land features or biomass.

Figure 1:
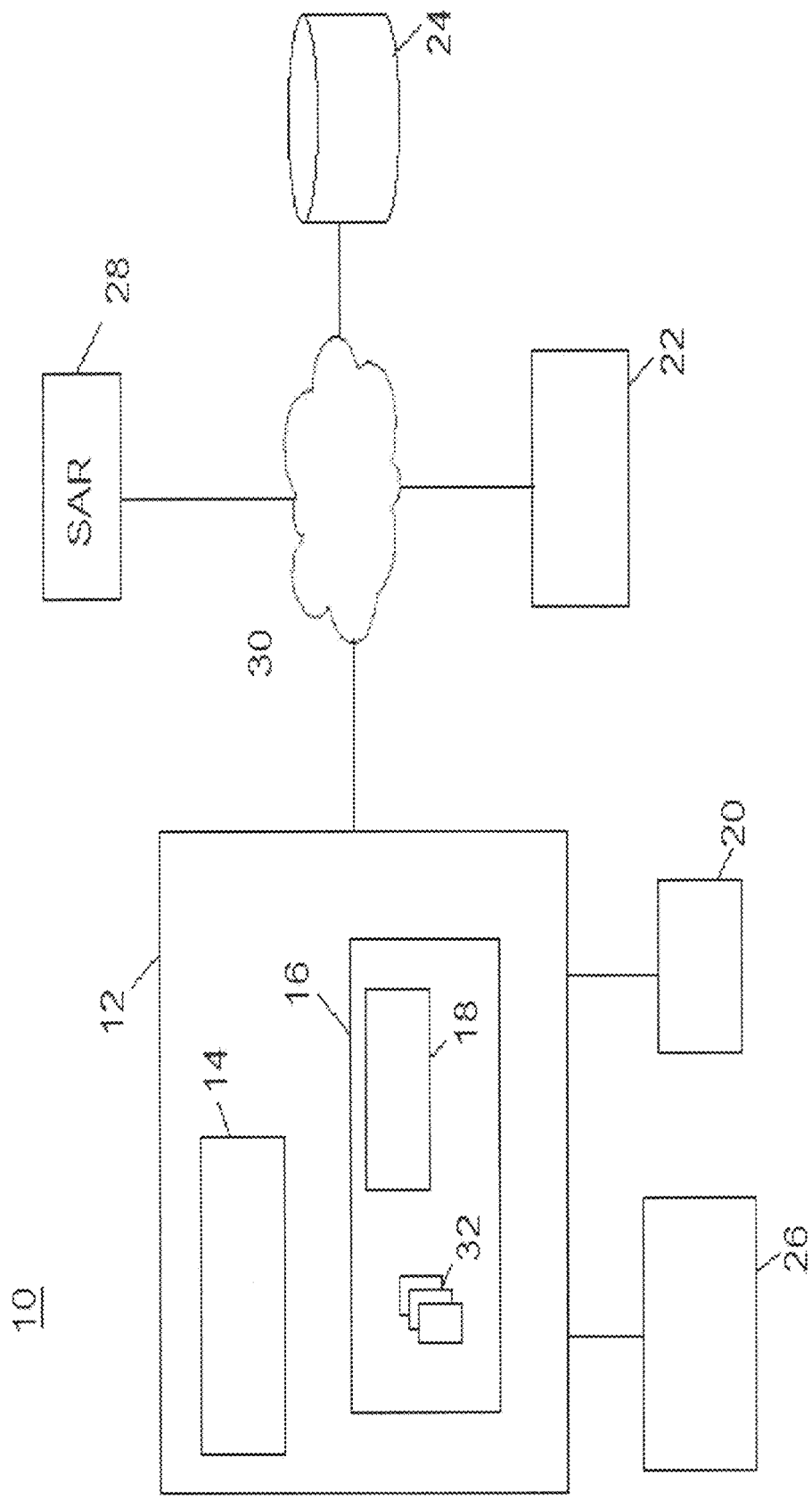
FIG. 1 depicts an embodiment of a processing system for acquiring, processing and/or analyzing synthetic aperture radar (SAR) image data.

Referring to FIG. 1, an embodiment of a data processing and analysis system 10 is shown. The system 10 includes a processing device 12 such as a computer (e.g., desktop, laptop, server, mainframe, etc.). The processing device 12 includes a processor 14 and a memory 16 that stores suitable software or programs 18, and also stores input data (e.g., SAR image, topological maps, ground measurement data and others) and algorithms for performing various image processing, modeling, mapping, and other analyses.

The processing device 12 may be coupled to, and/or integrated with other devices, including input/output (I/O) devices 20 such as a keyboard, mouse, printer and/or external storage. The processing device 12 includes suitable interfaces and links to various external devices or components such as client computers 22 and databases 24. Output and/or results may be presented on a display 26 or provided to another device for presentation or further processing or action. The methods described herein can be performed or executed on the processing device 12, the client computer 22 or any other processing unit or combination of processing units.

In one embodiment, the processing device 12 is connected to a SAR imaging device or system 28, such as a satellite or airborne radar system. The databases 24 may be configured to receive image data from one or more SAR systems for use by multiple computing devices. External devices or components may be connected to the processing device via any suitable wired or wireless configuration, such as the internet or other network 30.

The system 10 is configured to receive and process synthetic aperture radar (SAR) image data, including multi-polarization and/or fully polarimetric SAR images. Such processing may include pre-processing of SAR images to correct distortions, to calibrate image data and/or associate image data with terrestrial features such as biomass coverage and type, and land use features. SAR images are of use in many terrestrial imaging and analysis applications, such as mapping, land classification, resource monitoring and others. One such application is monitoring land use, forest loss and forest regeneration. A major advantage of satellite SAR is its ability to acquire images unaffected by clouds, and SAR images are of particular use in areas that are often or perpetually covered by clouds (e.g., rain forests). SAR radar is able to penetrate cloud cover and can provide a reliable source of relatively inexpensive data for creating forest and land maps.

Multi-polarization or fully polarimetric radar images can be used to form separate images for different polarization channels, each polarization channel representing a combination of transmitted and received polarizations. Each image can thus be processed and analyzed separately and combined as desired to provide an image of selected land features and attributes.

Polarization is an index describing the characteristics of electromagnetic waves and is used to express the orientation of the electric field. Typical polarizations include horizontal and vertical polarization, linear 45/−45° polarization, and left/right circular polarization. When the electric field is vertical, the electromagnetic wave is said to be vertically polarized (denoted by the letter "V"). When the electric field is horizontal, the electromagnetic wave is said to be horizontally polarized (denoted by the letter "H"). Elliptically and circularly polarized waves are formed by combining the vertically and horizontally polarized waves. Circular polarizations include left-hand ("L") polarization and right-hand ("R") polarization. Synthetic aperture radar may be designed to transmit and receive either horizontally or vertically polarized signals. Some SAR systems are capable of transmitting and receiving both horizontally or vertically polarized signals. Such systems are capable of employing single-polarization modes, such as HH (horizontal transmitting, horizontal receiving), VV (vertical transmitting, vertical receiving) polarizations, and multi-polarization modes such as HV (horizontal transmitting, vertical receiving) and VH (the reverse of HV) modes. Image data from each mode can be separated or processed separately to generate SAR images for each polarization mode.

Various distortions or inaccuracies can be introduced into the SAR image due to the nature of backscattering, atmospheric conditions, terrain features and other factors. For example, images of terrain with steep slopes can show geometric distortion due to radar parallaxes (e.g., foreshortening and layover), and radar shadow (parts of the terrain that were not illuminated and result in black or invalid image pixels and/or regions).

For processing of SAR image data, including multi-polarization or polarimetric image data, the system 10 includes various processing components that perform functions related to SAR image processing. These components are represented in FIG. 1 as modules 32. The modules may be software components, but are not so limited and may be any software or hardware component capable of performing image processing functions. Examples of modules include software components, modules, subroutines, control blocks, virtual machines, data objects, and others.

Figure 2:
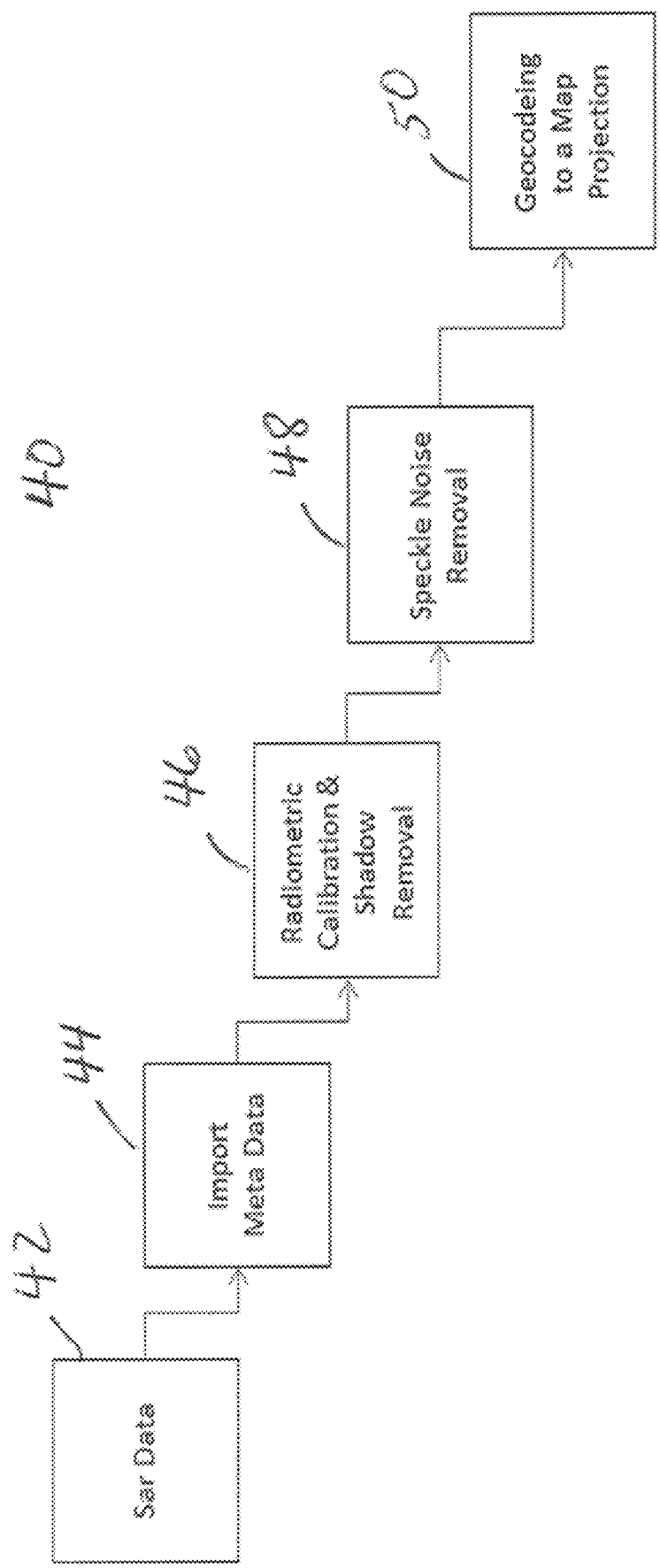
FIG. 2 depicts exemplary processing or computing modules configured to perform various SAR data acquisition, processing and/or analysis operations.

Exemplary SAR image processing modules are shown in FIG. 2, which represents components of a pre-processing system 40. Each component may represent one or more steps or stages of a SAR image pre-processing method that can be applied to SAR data 42. In one embodiment, the SAR data 42 includes image data generated by a multi-polarization or fully polarimetric SAR system. A data collection module 44 is connected to various SAR image and related data sources. For example, the data collection module 44 is connected to one or more SAR systems, such as satellite and/or airplane radar systems, and/or one or more databases or other data storage systems. The SAR data 42 may include one or more images having different polarizations. As used herein, a "SAR image" may refer to an image taken using a single polarization or multiple polarizations. In addition, a SAR image may be made up from multiple images taken at different times, e.g., multiple passes of a SAR system over a region.

One or more pre-processing units or modules are configured to process the SAR data 42 to generate images and information regarding features of the imaged region. For example, SAR data 42 including multiple polarization images and metadata are imported and input to a calibration module 46 configured to perform radiometric and/or geometric calibration, a speckle noise removal module 48 and/or a geocoding module 50.

Calibration is performed by the calibration module 44 (or other suitable processor or processors) to remove distortions due to effects such as the spreading loss effect, non-uniform antenna patterns, gain changes, saturation and others. Geometric calibration may be performed to correct geometric distortions such as foreshortening, layover, shadowing and others. Radiometric calibration (e.g., radiometric slope correction) may be performed to calibrate backscatter values so as to allow for comparison of images taken, e.g., at different time, in different modes and/or using different sensors. For example, spaceborne and aerial images are taken through the atmosphere, which is constantly changing. Radiometric calibration is performed to at least substantially remove such changes from the SAR image, to enable comparison of different images.

Various types of calibration processes may be utilized, and are not limited to the embodiments described herein. Calibration typically involves adjusting image values based on comparison with known features based on test images, reference images and other information. Look-up tables (LUTs) or other data structures may be generated for calibration. For example, LUTs may be utilized for estimation of backscatter coefficients.

One type of geometric calibration or correction is orthorectification, which is performed to remove image distortions due to topographical variations in the surface of the earth and the tilt of the satellite or aerial sensor, which affect the distance with which features on the satellite or aerial image are displayed. Image data acquired by airborne and satellites are affected by systematic sensor and platform-induced geometry errors, which introduce terrain distortions when the sensor is not pointing directly at the nadir location of the sensor.

Orthorectification includes comparing SAR images to elevation information to correct the geometry of an image so that it appears as though each pixel were acquired from directly overhead. Elevation information may be in the form of a model (e.g., a digital elevation model (DEM)) and/or topography maps to correct the location and distance of land features and remove image distortions.

Shadow removal is performed to correct or remove image portions that are affected by the terrain being imaged. Imaging depends on receiving signals reflected or backscattered from the ground. Due to terrain features, some of the signals do not return to the image recorder, resulting in pixels that are in shadow and thus have no value, i.e., are invalid (or have a value less than a selected threshold indicative of a shadow). Shadow removal processing is performed to remove such pixels based on angle of incidence and geological information from other sources.

In one embodiment, shadow removal is performed using topological information, such as a topography map, that provides information regarding terrain features and elevations. The topography map is generated independent of the SAR image using any suitable means. For example, the topological map is generated using optical imagery and/or ground surveys. Elevation information is used to determine the height and/or slope of land features at or near a region having low value or invalid pixels. This information is used to identify the shape and extent of shadows. Once the shadows are identified, removal is performed using any of a number of techniques. For example, additional SAR images of the region taken at a different time or from a different look angle are overlaid with the current image, and values from the overlaid image(s) are substituted for the shadow pixels. In one embodiment, values of pixels located proximate to the shadow pixels and/or located in areas of the image known to have similar features are used to estimate values for the shadow pixels. For example, neighboring pixels are determined and the shadowed pixels are replaced with values equal to or similar to neighboring pixels. In another embodiment, ground information, such as ground tests or optical images, are used to estimate a value for the shadow pixels. The values for the shadow pixels may be calculated by any combination of the above techniques.

Figure 3:
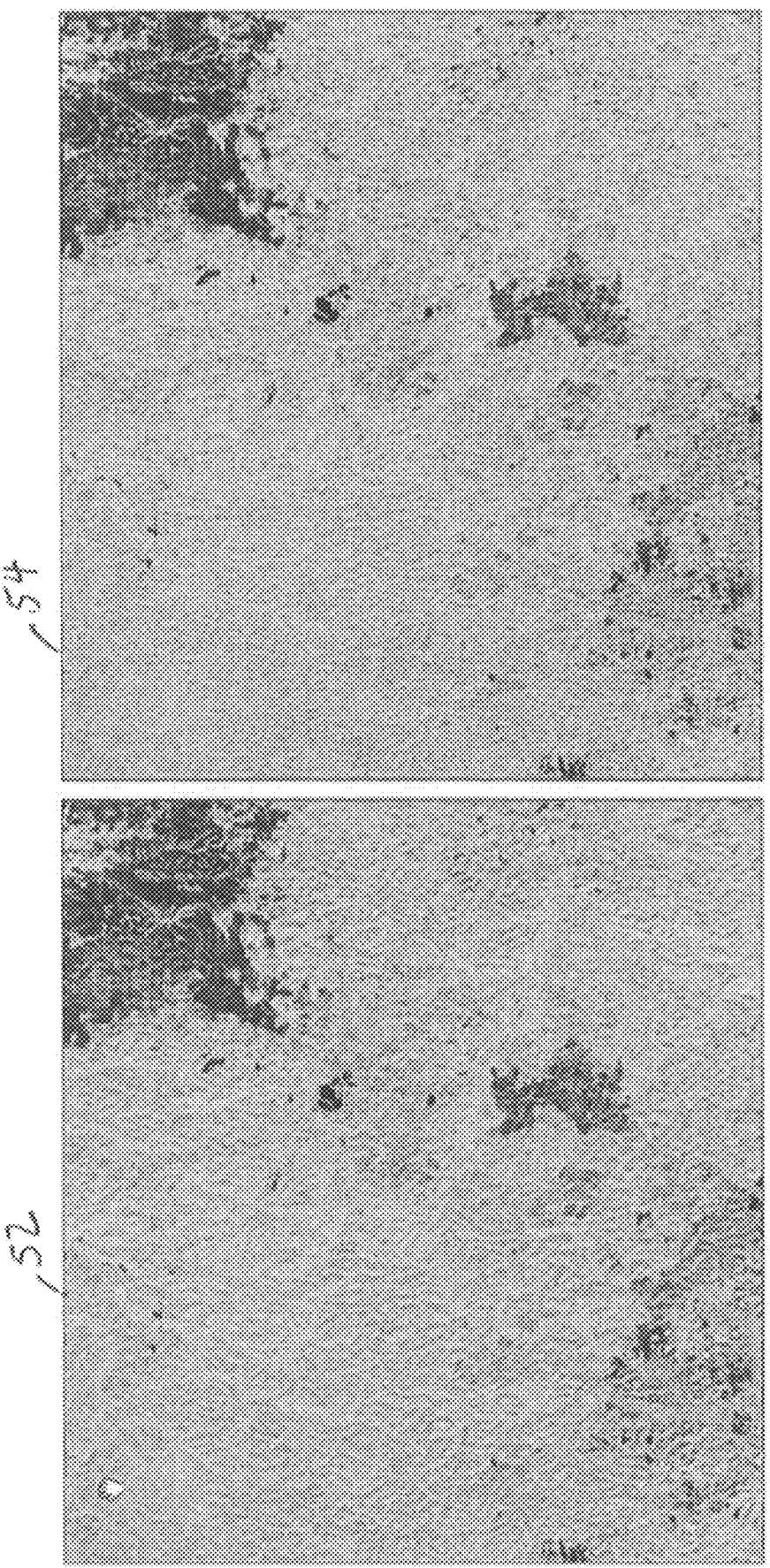
FIG. 3 depicts results of shadow removal processing on an exemplary multi-polarization SAR image.

FIG. 3 shows an example of the effects of shadow removal. Image 52 is a multi-polarization SAR image prior to shadow removal, and image 54 is the SAR image after shadow removal. It can be seen that the image 54 looks flatter due to the removal of shadows across the image due to ridges and other terrain features.

Radiometric calibration is performed by the calibration module 46 or other processor(s) to correct for effects on SAR images due to, e.g., antenna gain, the system loss, and the effective aperture of the SAR antenna. These effects result in a radiometric bias in the SAR image. The calibration is used to estimate scattering coefficients in the SAR equation associated with the SAR system. Calibration is performed using any suitable technique, such as comparison with reference images or the use of look-up tables to convert scattering coefficients calculated based on raw SAR data to calibrated values of the scattering coefficients.

Figure 4:
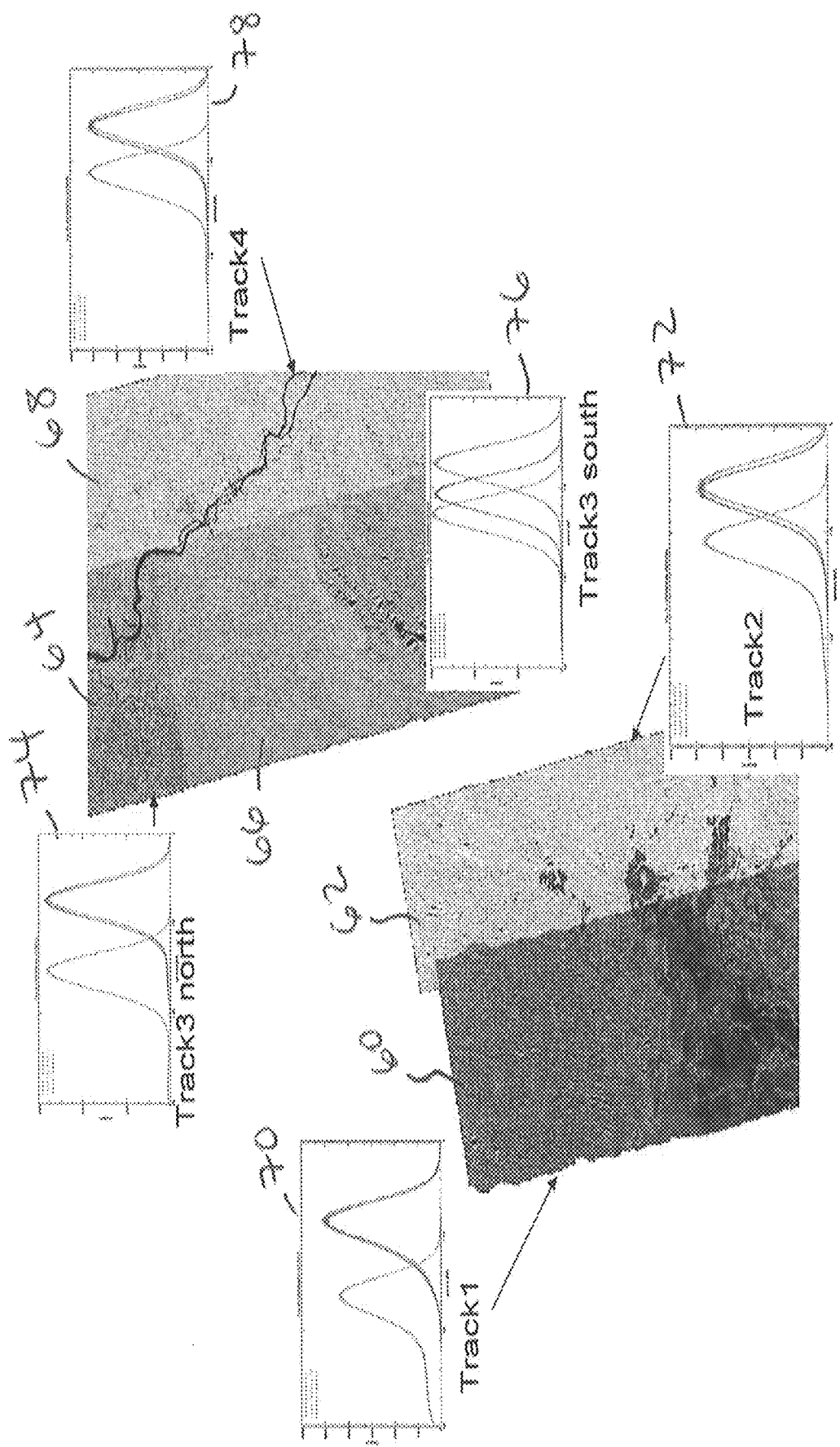
FIG. 4 illustrates aspects of radiometric calibration of exemplary multi-polarization SAR images.
Figure 5:
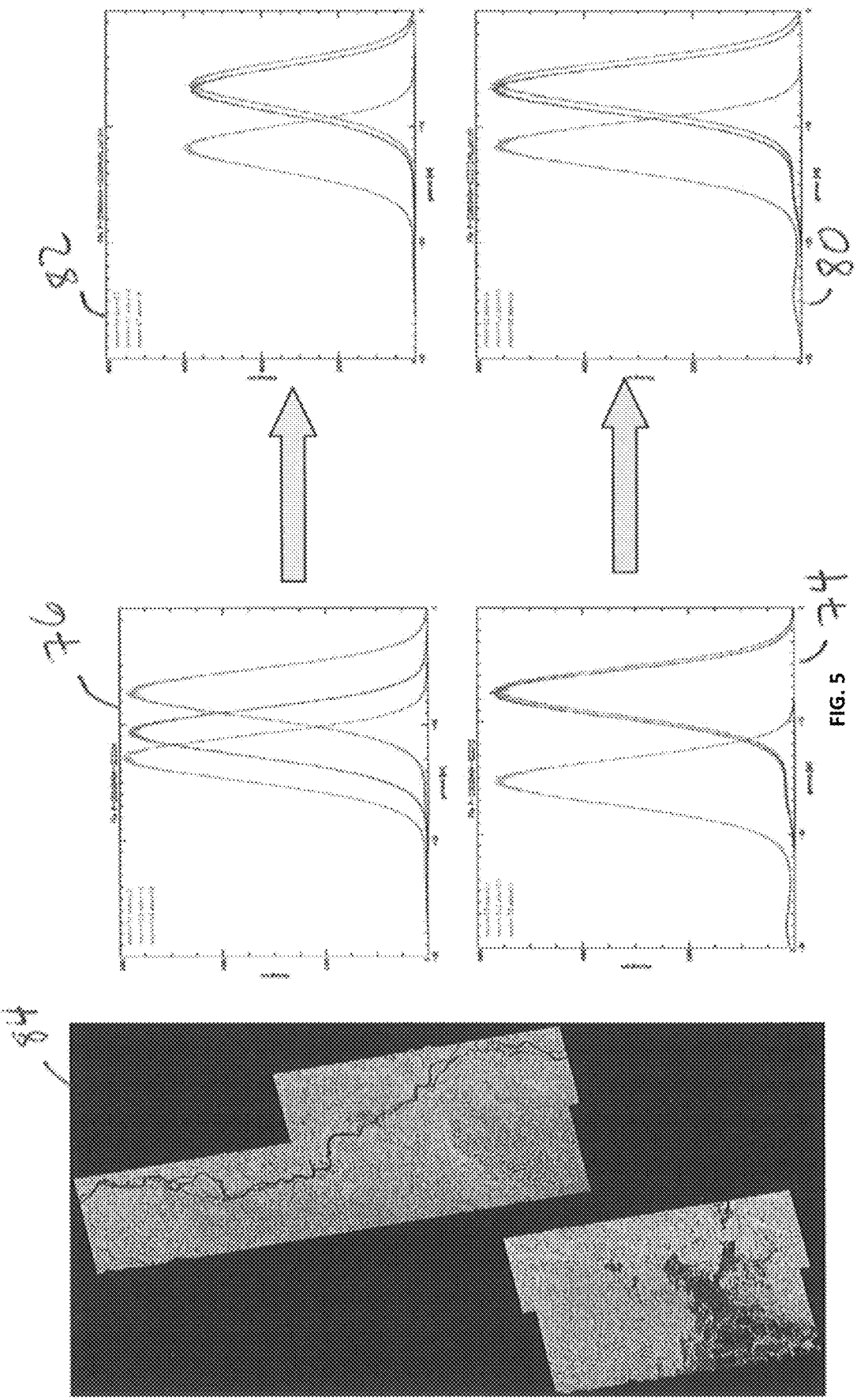
FIG. 5 illustrates aspects of the radiometric calibration of the multi-polarization SAR images of FIG. 4.

FIGS. 4 and 5 show an example of an aspect of radiometric calibration of satellite polarimetric SAR images. In this example, calibrated SAR images are acquired for a number of imaging areas, each associated with a different satellite pass. Images 60 and 62 (shown as Track1 and Track2) represent SAR images of adjacent areas that can be combined into a larger composite image. Likewise, images 64, 66 and 68 (shown as Track3 north, Track3 south and Track4) are SAR images of adjacent regions. For each image, a set of histograms are calculated. In the example of FIG. 4, the images 60, 62, 64, 66 and 68 are associated with histograms 70, 72, 74, 76 and 78, respectively.

The histogram for each image is compared to a reference histogram, such as a histogram calculated from a SAR image taken of the same region at a different time, or the histogram of a SAR image of an adjacent region. For example, as shown in FIG. 5, the histograms 74 and 76 corresponding to images 64 and 66 are compared to a reference histogram, such as the histogram 78. The histograms 74 and 76 are adjusted to resemble the histogram 78, e.g., by generating a look-up table based on the histogram 78. Adjustment produces corrected histograms 80 and 82 which are used to correct the images 64 and 66. This process is repeated for each image and associated histogram to produce corrected images, such as corrected composite images 84.

Radiometric calibration may also include radiometric slope correction to correct for distortions in the SAR image due to the angle of incidence of the transmitted radar signal and the azimuthal angle to the SAR detector. In one embodiment, topological information such as a topology map is used to estimate the elevation and local slope at each pixel location or at selected locations or areas within the image. This information, along with additional information such as the nominal incident angle, is used to correct backscattering coefficients for calibration.

Once selected calibration processes are performed, calibrated images may be further processed to remove speckle noise. Speckle noise removal, which may be performed by the speckle noise removal module 48 or other processor(s), is utilized to remove or reduce granular noise generated due to the roughness of scattering surfaces.

For example, a series of images of a region may be available over a relatively short period of time, i.e., a temporal series. These images are averaged to reduce speckle. In another example, speckle noise removal includes processing an image to extract temporal signatures (characteristic temporal change in backscatter for specific land classes or features) from the image. Filters such as low pass or median filters may be applied to reduce speckle effects. In one embodiment, speckling is reduced by lowering the resolution of the image, averaging neighboring pixels of the higher resolution, and replacing the group of neighboring pixels with a larger pixel having the average value.

After processing a SAR image as discussed above, the multi-polarization image is analyzed to select those polarization modes that most effectively indicate the type of terrain feature of interest. For example, the SAR images discussed herein may be dual polarized, multi-polarized or fully polarimetric images. Individual polarizations (i.e., polarization modes) are assessed and correlated to other information, such as ground measurement information.

In one embodiment, a multi-polarization SAR image is separated into individual images, each formed by a different polarization combination or mode (e.g., HH, HV, etc.) and/or a different processing type. The individual images can be separately analyzed to determine the most accurate images of different land attributes.

Figure 6:
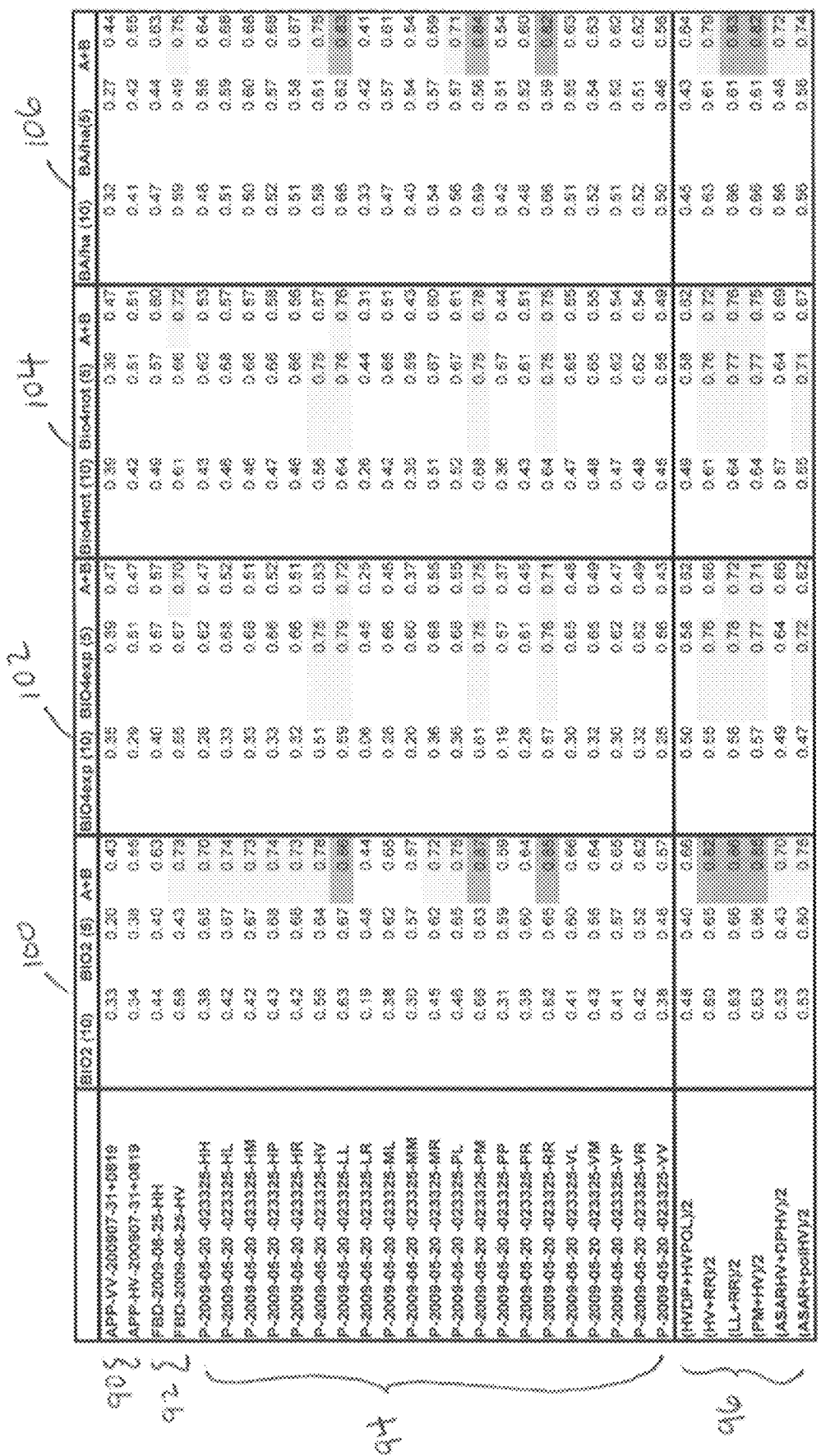
FIG. 6 depicts exemplary polarization models derived from multi-polarization SAR image data, and comparison of the models with ground data.

FIGS. 5 and 6 illustrate an example of correlation and polarization selection. In this example, a multi-polarization image is separated into polarization modes and pre-processed (individually and/or in combination) as described above. Each image is analyzed to estimate an attribute or characteristic of the imaged region, such as biomass amount or type.

As shown in FIG. 6, a multi-polarization SAR image can be separated into a large number of channels, each channel representing an image generated by a specific polarization mode and/or processing type. FIG. 6 shows a table that includes information regarding a plurality of polarization channels, which are listed in the first (left-hand) column 100. For example, channels 90 labeled as "APP-VV" and "APP-HV" represent alternating polarization modes using VV and HV polarization, respectively, and channels 92 labeled as "FBD-HH" and "FBD-HV" represent alternating polarization modes using HH and HV polarization, respectively. Channels 94 represent different polarization modes, where the last two letters of the label for each channel represent receive and transmit polarizations (the left-hand letter representing the transmit polarization and the right-hand letter representing the receive polarization). In this example, "H" is horizontal, "V" is vertical, "R" is right-hand circular, "L" is left-hand circular and "PM refers to polarization matrix. Channels 96 represent images generated by averaging different polarization modes. The polarization modes represented in channels 96 include horizontal transmit and vertical receive dual polarization (referred to as HVDP or DPHV), horizontal transmit and vertical receive polarization (referred to as HVPOL or POLHV), and the European Space Agency's Advanced Synthetic Aperture Radar (ASAR) system having a HV polarization (ASARHV).

Figure 7:
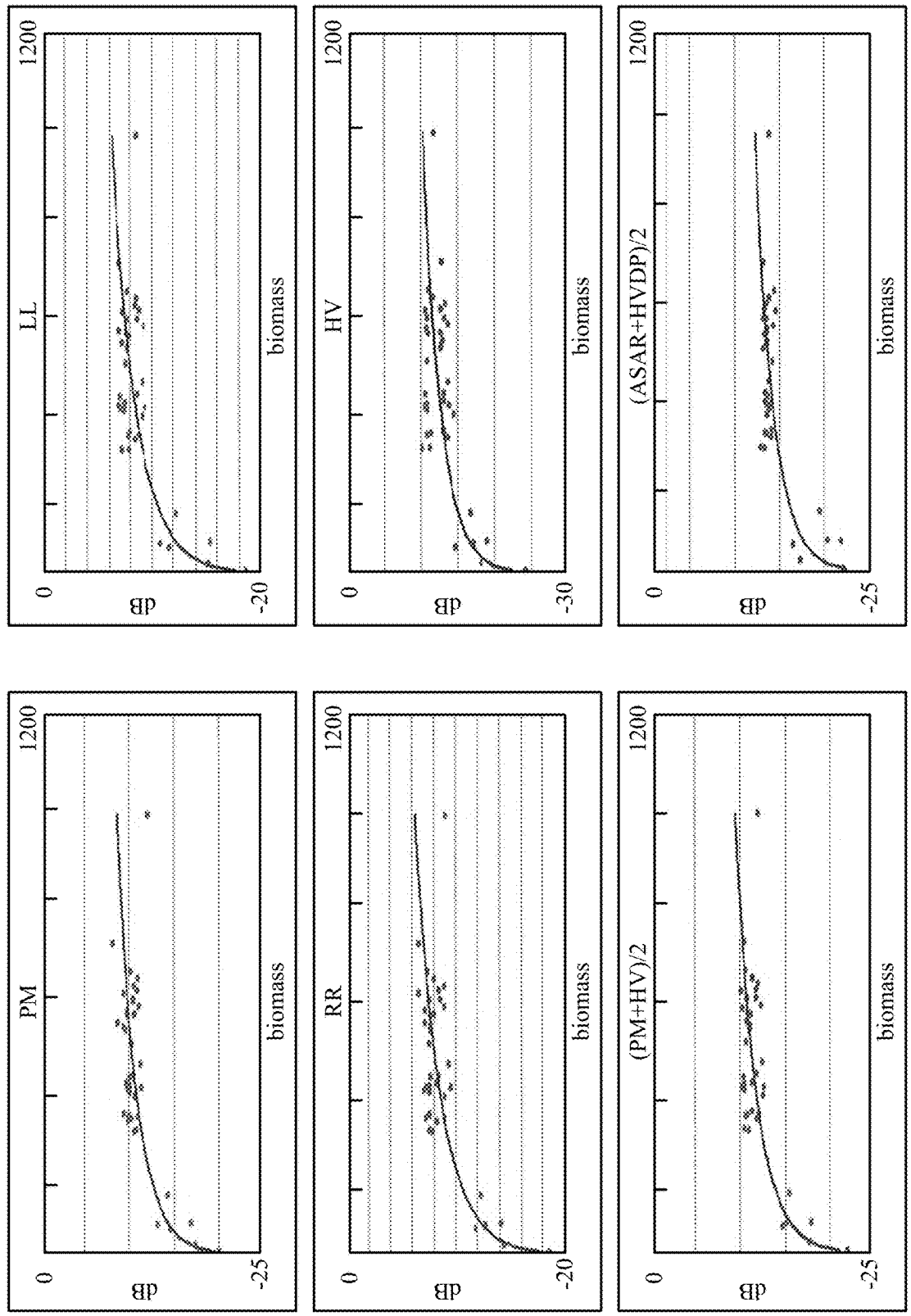
FIG. 7 depicts correlation of polarization models of FIG. 6 with ground data.

The second column BIO2 (10) and BIO2 (5) and "A+B" represent normalized values for biomass calculated based on different equations. Ground information is used to generate biomass values as shown in columns 102, 104 and 106, each of which represent different methods of calculating biomass based on ground data. "Ground data" may include any kind of data reflecting estimates of terrestrial characteristics taken independent of the SAR system, such as visual data (photographs, maps), survey data and other information. In this example, biomass values calculated based on channels PM, LL, RR, HV, (PM+HV)/2 and (ASAR+HVDP)/2 show good correlation with ground data, as shown in FIG. 7. Thus, a multi-polarization image may be generated using only channels such as those that show good correlation with ground values.

Figure 8:
FIG. 8 depicts results of processing an exemplary multi-polarization SAR image into a biomass map.

As shown in FIG. 8, SAR images can be processed to calculate biomass amounts. For example, a raw image 110 is processed as discussed above and biomass amounts are calculated based on the brightness or intensity of each selected polarization mode of the image 110. Pixels in the image are color-coded based on biomass amount. The image 110 in FIG. 8 is processed to generate a biomass amount map 112, in which pixels and/or areas in the image are assigned colors based on the biomass amount. In this example, purple represents 0-10 tons per hectare (ton/ha), dark blue represents 10-30 ton/ha, light blue represents 30-60 ton/ha, dark green represents 50-100 ton/ha, light green represents 100-200 ton/ha, yellow represents 200-300 ton/ha, light orange represents 300-400 ton/ha, dark orange represents 400-500 ton/ha, red represents 500-600 ton/ha, and brown represents greater than 600 ton/ha.

Figure 9:
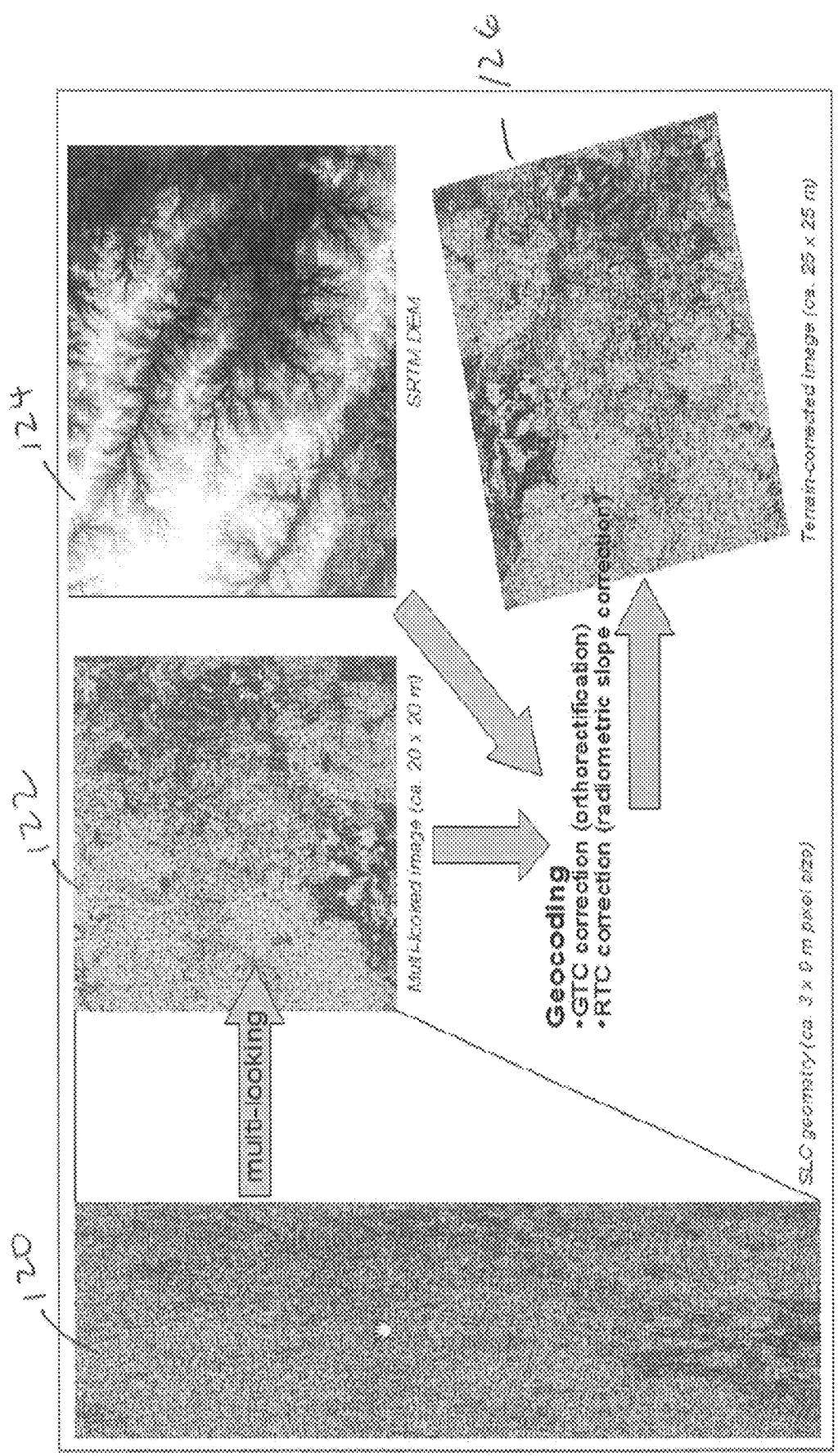
FIG. 9 depicts aspects of pre-processing an exemplary multi-polarization SAR image.

FIG. 9 shows an example of preprocessing a multi-polarization SAR image using the systems and methods described herein. In this example, a raw SAR image 120 is acquired, which has a non-uniform pixel size. Pre-processing steps including multi-looking techniques are performed to remove noise and produce uniform (e.g., square) pixels. Multi-looking involves dividing the SAR image into different frequencies, and averaging the different frequency images, which will reduce the speckle noise and square the pixels. A multi-looked image 122 results, which is further pre-processed to remove shadows, calibrate the image and further remove speckle noise as discussed above. In this example, the multi-looked image 122 is compared with an independently generated topological map 124 to provide feature information, including size, slope and shadow size and shape, to assist in removing shadows and performing slope correction. The resulting image is then geocoded to produce a pre-processed SAR image 126 that can be further analyzed to estimate terrestrial characteristics or features such as biomass amount and type.

Figure 10:
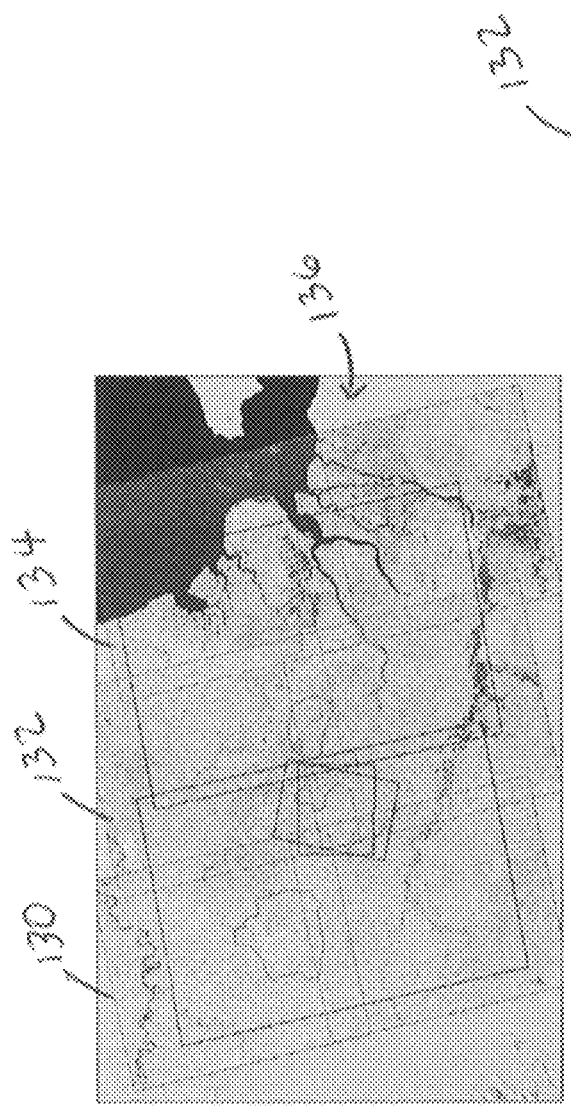
FIG. 10 depicts results of processing an exemplary multi-polarization SAR image into a forest classification map.
Figure 10:
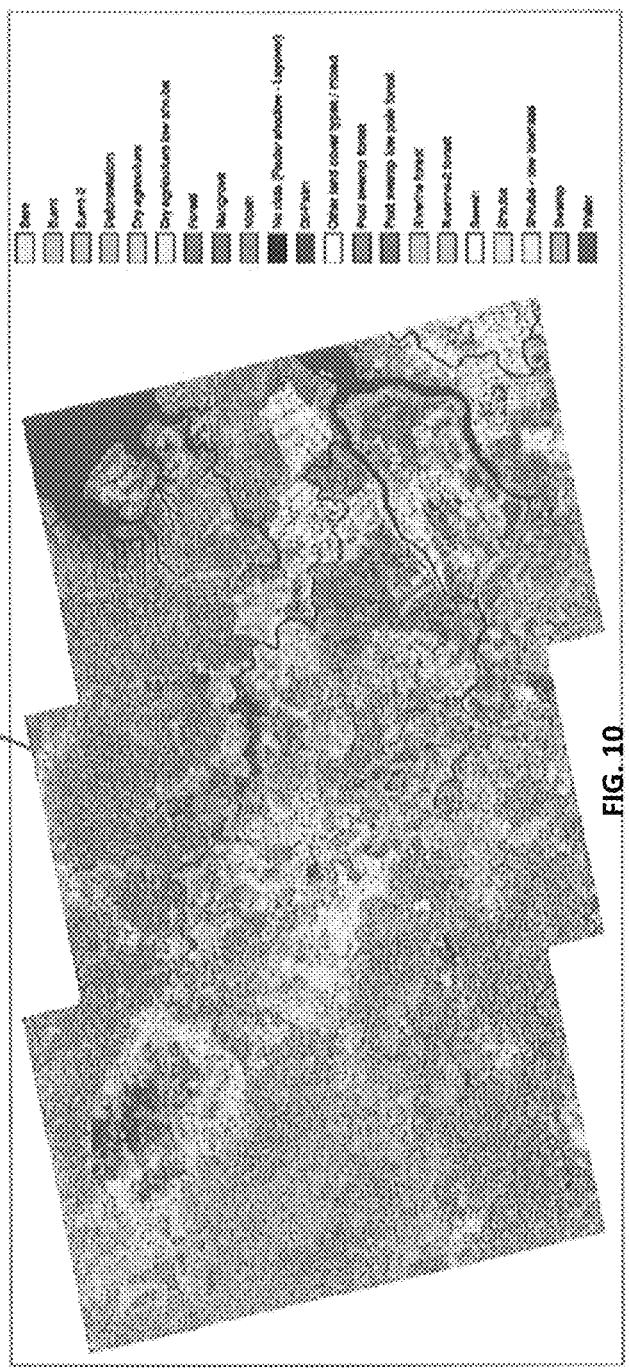

FIG. 10 shows an example of a biomass type map derived from multi-polarization SAR image data. In this example, Multi-polarization images 130, 132 and 134 are taken for adjacent land regions or areas. The images are pre-processed as discussed above to correct and calibrate the images, and polarization modes of the images are selected based on correlation with ground values. The resulting composite image is analyzed to calculate biomass types and a biomass type map 136 is generated.

Figure 11:
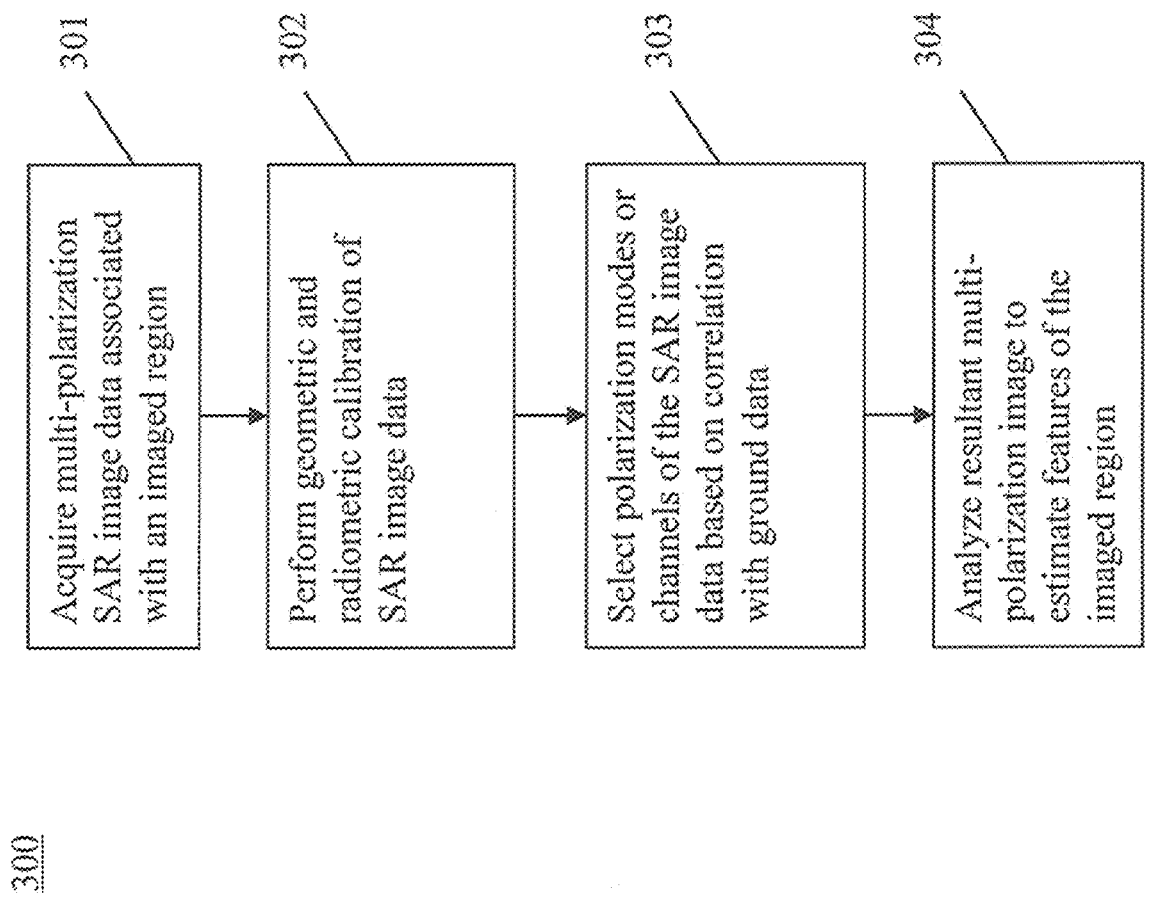
FIG. 11 is a flow diagram illustrating an embodiment of a method of processing and/or analyzing multi-polarization SAR image data.

The modules, systems and their functionality may be used in a processing and/or analysis method 300, shown in FIG. 11. The method 300 may be executed by a user and/or one or more computer processing systems, such as the processing device 12 and/or one or more modules. The method 300 includes one or more stages 301-304. In one embodiment, the method 300 includes the execution of all of stages 301-304 in the order described. However, certain stages may be omitted, stages may be added, or the order of the stages changed.

In the first stage 301, SAR data is acquired. The SAR data includes one or more images and accompanying metadata, which provides information regarding the image, such as image location and time, satellite (or plane) location, pixel resolution and angle of incidence (θi). The SAR data may include multiple constituent images or channels representing different polarizations. In the second stage 302, calibration is performed, including radiometric calibration and geometric calibration. Exemplary calibration processes include radiometric slope removal, orthorectification, shadow removal and speckle removal as discussed above. In the third stage 303, one or more polarization modes of the SAR data are analyzed and correlated with ground data to generate a multi-polarization image having polarization modes selected based on the correlation. In the fourth stage 304, the multi-polarization image is analyzed to estimate characteristics and features of an imaged area or region. For example, a biomass amount and/or type map is calculated based on the multi-polarization image.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the various pumping devices, flow controllers and temperature control devices and assemblies described herein. In addition, analysis components may be used for centralized controllers to control operation of the filling and supply systems described herein. The digital and/or analog systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for processing synthetic aperture radar (SAR) image data, the method comprising:
   acquiring a multi-polarization SAR image of a terrestrial region;
   pre-processing the SAR image to remove or reduce radiometric and geometric errors;
   separating the SAR image into a plurality of channels, each of the plurality of channels representing an image associated with one of a plurality of polarization modes;
   calculating a first characteristic of the region for each of the plurality of channels to yield a calculated characteristic of the region;
   estimating a second characteristic of the region based on ground data to yield an estimated characteristic of the region;
   estimating a correlation between the calculated characteristic for each of the plurality of channels and the estimated characteristic;
   selecting one or more of the plurality of channels when the correlation exceeds a selected value to yield selected polarization channels; and
   generating a SAR image including only the selected polarization channels to yield a generated SAR image.

2. The method of claim 1, wherein at least one of the first characteristic and the second characteristic is a biomass amount and/or a biomass type.

3. The method of claim 1, further comprising:
   generating a biomass map based on the generated SAR image.

4. The method of claim 1, wherein the multi-polarization SAR image is acquired from a spaceborne SAR system.

5. The method of claim 1, wherein the pre-processing includes identifying shadows in the SAR image and removing the shadows from the SAR image.

6. The method of claim 5, wherein the identifying of the shadows includes selecting image pixels having a value less than a selected threshold, and comparing the SAR image to topological information generated independent of the SAR image.

7. The method of claim 6, wherein the removing of the shadows includes replacing pixels located in the shadows with pixel values calculated by overlaying the SAR image with another SAR image of the region and calculating an average value of one or more pixels proximate to the pixels located in the shadows.

8. The method of claim 1, wherein the pre-processing includes radiometrically calibrating the SAR image, wherein the radiometrically calibrating includes calculating a histogram of the SAR image, comparing the histogram to a reference histogram to yield a comparison, and adjusting pixel values based on the comparison.

9. The method of claim 8, wherein the reference histogram is associated with another SAR image of the region taken at another time and/or at least a portion of an adjacent region SAR image taken of an adjacent region.

10. The method of claim 1, wherein pre-processing includes geometrically and radiometrically calibrating the SAR image based on information including an incidence angle of a detected backscatter signal, and based on slope information derived from topological information generated independent of the SAR image.

11. A system for processing synthetic aperture radar (SAR) image data, the system comprising:
   a processing device configured to execute instructions stored on a machine-readable medium, the processing device including:
      a data collection module configured to acquire a multi-polarization SAR image of a terrestrial region; and
      a pre-processing module configured to:

pre-process the SAR image to remove or reduce radiometric and geometric errors;

separate the SAR image into a plurality of channels, each of the plurality of channels representing an image associated with one of a plurality of polarization modes;

calculate a first characteristic of the region for each of the plurality of channels to yield a calculated characteristic of the region;

estimate a second characteristic of the region based on ground data to yield an estimated characteristic of the region;

estimate a correlation between the calculated characteristic for of the plurality of channels and the estimated characteristic;

select one or more of the plurality of channels when the correlation exceeds a selected value to yield selected polarization channels; and generate a SAR image including only the selected polarization channels to yield a generated SAR image.

12. The system of claim 11, wherein at least one of the first characteristic and the second characteristic is a biomass amount and/or a biomass type.

13. The system of claim 11, wherein the pre-processing module is further configured to generate a biomass map based on the generated SAR image.

14. The system of claim 11, wherein the multi-polarization SAR image is acquired from a spaceborne SAR system.

15. The system of claim 11, wherein pre-processing of the SAR image includes identifying shadows in the SAR image and removing the shadows from the SAR image.

16. The system of claim 15, wherein the identifying of the shadows includes selecting image pixels having a value less than a selected threshold, and comparing the SAR image to topological information generated independent of the SAR image.

17. The system of claim 16, wherein the removing of the shadows includes replacing pixels located in the shadows with pixel values calculated by overlaying the SAR image with another SAR image of the region and calculating an average value of one or more pixels proximate to the pixels located in the shadows.

18. The system of claim 11, wherein pre-processing of the SAR image includes radiometrically calibrating the SAR image, wherein the radiometrically calibrating includes calculating a histogram of the SAR image, comparing the histogram to a reference histogram to yield a comparison, and adjusting pixel values based on the comparison.

19. The system of claim 18, wherein the reference histogram is associated with another SAR image of the region taken at another time and/or at least a portion of an adjacent region SAR image taken of an adjacent region.

20. The system of claim 11, wherein pre-processing of the SAR image includes geometrically and radiometrically calibrating the SAR image based on information including an incidence angle of a detected backscatter signal, and based on slope information derived from topological information generated independent of the SAR image.

* * * * *